US010237109B2

United States Patent
Wilson et al.

(10) Patent No.: US 10,237,109 B2
(45) Date of Patent: Mar. 19, 2019

(54) MITIGATING PASSIVE INTERMODULATION INTERFERENCE IN A WIRELESS NETWORK

(71) Applicant: AceAxis Limited, Harlow (GB)

(72) Inventors: Fiona Wilson, Harlow (GB); Simon Gale, Harlow (GB); David Damian Bevan, Harlow (GB)

(73) Assignee: AceAxis Limited, Harlow (GB)

( * ) Notice: Subject to any disclaimer, the term of this patent is extended or adjusted under 35 U.S.C. 154(b) by 0 days.

(21) Appl. No.: 15/485,083

(22) Filed: Apr. 11, 2017

(65) Prior Publication Data

US 2017/0222858 A1    Aug. 3, 2017

Related U.S. Application Data

(63) Continuation of application No. PCT/GB2015/053079, filed on Oct. 16, 2015.

(30) Foreign Application Priority Data

Oct. 17, 2014 (GB) .................................. 1418494.9

(51) Int. Cl.
   *H04L 27/26* (2006.01)
   *H04L 25/02* (2006.01)
   *H04B 1/12* (2006.01)

(52) U.S. Cl.
   CPC ......... *H04L 27/2688* (2013.01); *H04B 1/123* (2013.01); *H04L 25/0262* (2013.01)

(58) Field of Classification Search
   CPC .... H04B 1/1036; H04B 1/123; H04B 1/1027; H04B 1/109
   See application file for complete search history.

(56) References Cited

U.S. PATENT DOCUMENTS 8,249,540 B1    8/2012 Gupta et al.
2002/0161560 A1*   10/2002 Abe ...................... H04L 1/005
                                                                702/196
(Continued)

FOREIGN PATENT DOCUMENTS

GB    2502279 A    11/2013
GB    2502281 A    11/2013
(Continued)

OTHER PUBLICATIONS

Kahrizi, M.; Komaili, J.; Vasa, J.E.; Agahi, D., "Adaptive filtering using LMS for digital TX IM2 cancellation in WCDMA receiver," Radio and Wireless Symposium, 2008 IEEE, pp. 519-522, Jan. 22-24, 2008 See p. 521.

(Continued)

*Primary Examiner* — Aristocratis Fotakis
(74) *Attorney, Agent, or Firm* — EIP US LLP

(57) ABSTRACT

Interference ($I_1$, $I_2$) is mitigated in a waveform received at the input of a receiver in a wireless network, the interference comprising passive intermodulation PIM products of at least a first signal ($C_1$). A first stream of time samples (5) is generated of a simulated first PFM product of at least the first signal ($C_1$), and a second stream of time samples (6) is generated of the simulated first PIM product. The second stream has a delay with respect to the first stream. A replica (8) is generated of the interference by processing (7) at least the first stream and the second stream, the processing comprising reducing a degree of correlation between the first stream and the second stream, and the replica of the interference is combined with a stream of time samples of the received waveform (40) to reduce the interference in the received waveform.

16 Claims, 13 Drawing Sheets

(56) References Cited

U.S. PATENT DOCUMENTS

| | | | | |
|---|---|---|---|---|
| 2012/0140685 A1* | 6/2012 | Lederer | ............ | H04L 25/03057 |
| | | | | 370/286 |
| 2012/0295558 A1* | 11/2012 | Wang | .................... | H04B 1/109 |
| | | | | 455/79 |
| 2013/0310090 A1* | 11/2013 | Bevan | ................. | H04B 1/1027 |
| | | | | 455/501 |
| 2014/0036969 A1* | 2/2014 | Wyville | ................... | H04B 1/38 |
| | | | | 375/219 |
| 2015/0145528 A1* | 5/2015 | Yeo | ........................ | G01R 29/10 |
| | | | | 324/629 |
| 2015/0244414 A1* | 8/2015 | Yu | ......................... | H04B 1/525 |
| | | | | 455/73 |
| 2015/0358144 A1* | 12/2015 | Fleischer | ............ | H04B 17/104 |
| | | | | 370/242 |
| 2016/0006468 A1* | 1/2016 | Gale | ................... | H04B 1/1036 |
| | | | | 455/296 |
| 2016/0142229 A1* | 5/2016 | Bevan | ................... | H04B 1/123 |
| | | | | 455/307 |

FOREIGN PATENT DOCUMENTS

| | | |
|---|---|---|
| GB | 2508443 A | 6/2014 |
| GB | 2511865 A | 9/2014 |
| WO | 2009082084 A1 | 7/2009 |

OTHER PUBLICATIONS

Gun-hyun Ahn et al., "A RF predistorter using a delay mismatch for an additional IM3 path," Microwave Conference, 2007. European, pp. 52-55, Oct. 9-12, 2007 See Fig. 2.

* cited by examiner

MITIGATING PASSIVE INTERMODULATION INTERFERENCE IN A WIRELESS NETWORK

CROSS-REFERENCE TO RELATED APPLICATIONS

This application is a continuation of International Application No. PCT/GB2015/053079, filed Oct. 16, 2015 which claims the benefit of UK Patent Application No. GB 1418494.9, filed on Oct. 17, 2014. Each of the above-referenced patent applications is incorporated by reference in its entirety.

BACKGROUND OF THE INVENTION

Field of the Invention

The present invention relates generally to methods and apparatus for processing interference due to non-linear products of transmitted signals in a wireless network, and more specifically, but not exclusively, to reduction of interference caused to a receiver due to passive intermodulation (PIM) products generated at more than one PIM source.

Description of the Related Technology

Non-linear products may be generated in a wireless network when one or more signals are transmitted along a signal path including a component having a non-linear transmission characteristic; these products differ in frequency from the signal or signals from which they were generated, and may potentially cause interference to other signals. The generation of non-linear products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station, it is likely that circumstances arise in which non-linear products generated from transmitted carriers in one or more downlink bands would fall within an uplink band in which signals are received at the base station. Non-linear products generated by non-linear characteristics of active components such as power amplifiers may generally be dealt with at a design stage by appropriate frequency management and filtering, but non-linear products caused by non-linear characteristics of passive components, for example passive intermodulation (PIM) products, may prove more difficult to manage. Many passive components may exhibit a non-linear transmission characteristic to some degree, for example due to an oxide layer at a metal to metal contact, and the non-linear characteristic may develop with time as an ageing process of the component. For example antenna and diplexer components, which are external to a receiver but connected to it, may generate PIM to some extent. Furthermore, PIM may be caused by components in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect.

Interference due to PIM may reduce the carrier to interference ratio at a receiver, which may reduce coverage by a cell significantly. The applicant's patent application GB2502279 addresses the reduction of interference caused by non-linear products of transmitted signals. Simulated interference signals are generated from a transmitted signal or signals, the simulated interference signals comprising simulated non-linear products of the transmitted signal or signals. The simulated interference signals may be correlated with a received waveform to detect whether or not the simulated non-linear products correspond to non-linear products that are present in received interference. The interference in the received waveform may be reduced by combining the simulated interference signals with received signals with an appropriate amplitude and phase relationship to cancel or reduce the interference.

In some circumstances the reduction of interference in the received waveform is limited when the interference comprises PIM from more than one source of PIM, in particular when the PIM sources are located at different distances from the receiver so that the round trip delay from the transmitter to the PIM source and back to the receiver is different for each PIM source.

It is an object of the invention to address at least some of the limitations of the prior art systems.

SUMMARY

In accordance with a first aspect of the present invention, there is provided a method of mitigating interference in a waveform received at the input of a receiver in a wireless network, the interference comprising passive intermodulation (PIM) products of at least a first signal, the method comprising:

generating a first stream of time samples of a simulated first PIM product of at least the first signal, and generating a second stream of time samples of the simulated first PIM product, wherein the second stream has a delay with respect to the first stream;

generating a replica of the interference by processing at least the first stream and the second stream, wherein said processing comprises reducing a degree of correlation between the first stream and the second stream; and combining the replica of the interference with a stream of time samples of the received waveform, whereby to reduce the interference in the received waveform.

This has an advantage that the replica of the interference can be generated to simulate interference comprising PIM products generated at two sources having different round trip delays between a transmitter of the first and second signals causing the PIM, the PIM source, and the receiver. The replica can then be used to cancel the interference in the received waveform effectively. Reducing a degree of correlation between the first stream and the second stream has an advantage that the effectiveness of the cancellation of the interference is improved for cases where the first and second stream are correlated.

In an embodiment of the invention, the processing comprises weighting the first stream by a first weighting factor and weighting the second stream by a second weighting factor.

This has an advantage that the phase and amplitude of the first stream may be set independently of the second, delayed, stream to allow for the different propagation characteristics of a first and second source of PIM.

In an embodiment of the invention, the method comprises determining the first weighting factor by correlating the first stream with the stream of time samples of the received waveform, and determining the second weighting factor by correlating the second stream with the stream of time samples of the received waveform.

This allows the first and second weighting factors to be set to values that will increase a depth of cancellation of PIM products in the interference when the replica is combined with the stream of time samples of the received waveform.

In an embodiment of the invention, reducing a degree of correlation between the first stream and the second stream comprises:

determining a correlation between the first stream and the second stream;

determining a weighting factor in dependence on the correlation;

weighting the first stream of time samples using the weighting factor; and combining the weighted first stream with the second stream to produce a processed second stream of time samples having a reduced degree of correlation with the first stream of time samples.

This provides an effective method of reducing the degree of correlation between the first and second streams.

In an embodiment of the invention, the method comprises performing the step of reducing the degree of correlation between the first stream and the second stream in dependence on an analysis of a correlation between the first stream of time samples and a stream of time samples of the received waveform.

This has an advantage that the processing load involved in performing the step of reducing the degree of correlation between the streams may be avoided in cases where analysis of the correlation between the first stream of time samples and the stream of time samples of the received waveform indicates that the step is not required.

In an embodiment of the invention, the analysis of the correlation between the first stream of time samples and the stream of time samples of the received waveform comprises determining a width of a correlation peak.

This provides an effective method of determining whether or not the decorrelation step is required, since the width of the correlation peak may indicate whether there is more than one source of PIM contributing to the peak.

In an embodiment of the invention, generation and processing of the first stream and the second stream is at baseband.

This provides an efficient method of generating and processing the streams.

In an embodiment of the invention, the method comprises varying a value of the delay of the second stream with respect to the first stream to determine a delay value that increases a degree of cancellation of interference in the received waveform.

This allows an appropriate delay value to be selected.

In an embodiment of the invention, the method comprises determining the delay value on the basis of trial values of delay applied to stored data representing the first stream of time samples, the second stream of time samples, and the stream of time samples of the received waveform; and using the determined delay to generate the replica of the interference for use in cancelling the interference in the received waveform in real time.

This allows a delay value to be determined in non-real time by the analysis of stored data, without affecting the real-time receive path.

In an embodiment of the invention, the method comprises forming the replica as a matrix, a first axis the matrix representing time and a second axis of the matrix representing a respective stream of time samples of a plurality of streams of time samples.

This provides a convenient method of representing the replica. The matrix may consist of weighted streams of time samples without a combination step.

In an embodiment of the invention, the method comprises generating a plurality of streams of time samples comprising a first plurality of streams of time samples for a plurality of values of PIM product exponent and a second plurality of streams of time samples for the plurality of values of PIM product exponent, the second plurality of streams of time samples having a value of delay with respect to the first plurality of streams of time samples that is the same for each value of PIM product exponent.

This allows the replica to comprise PIM products having several values of exponent.

In an embodiment of the invention, the value of delay of the second plurality of streams of time samples with respect to the first plurality of streams of time samples is determined by varying a value of the delay to determine a delay value that increases a degree of cancellation of interference in the received waveform for the first value of PIM product exponent.

This provides an efficient method of determining the delay value for the second plurality of streams.

In accordance with a second aspect of the present invention, there is provided apparatus for mitigating interference in a waveform received at the input of a receiver in a wireless network, the interference comprising passive intermodulation (PIM) products of at least a first signal, the apparatus being configured to:

generate a first stream of time samples of a simulated first PIM product of at least the first signal, and generating a second stream of time samples of the simulated first PIM product, wherein the second stream has a delay with respect to the first stream; and generate a replica of the interference by processing at least the first stream and the second stream, wherein said processing comprises reducing a degree of correlation between the first stream and the second stream; and combine the replica of the interference with a stream of time samples of the received waveform, whereby to reduce the interference in the received waveform.

Further features and advantages of the invention will be apparent from the following description of preferred embodiments of the invention, which are given by way of example only.

DETAILED DESCRIPTION OF CERTAIN INVENTIVE EMBODIMENTS

By way of example, embodiments of the invention will now be described in the context of detection and reduction of interference caused by non-linear products, typically passive intermodulation (PIM) products, in cellular wireless networks such as GSM, 3G (UMTS) and LTE (Long Term Evolution) networks comprising GERAN, UTRAN and/or E-UTRAN radio access networks, but it will be understood that embodiments of the invention may relate to other types of radio access network, for example IEEE 802.16 WiMax systems, and that embodiments of the invention are not restricted to cellular wireless system.

Figure 1:
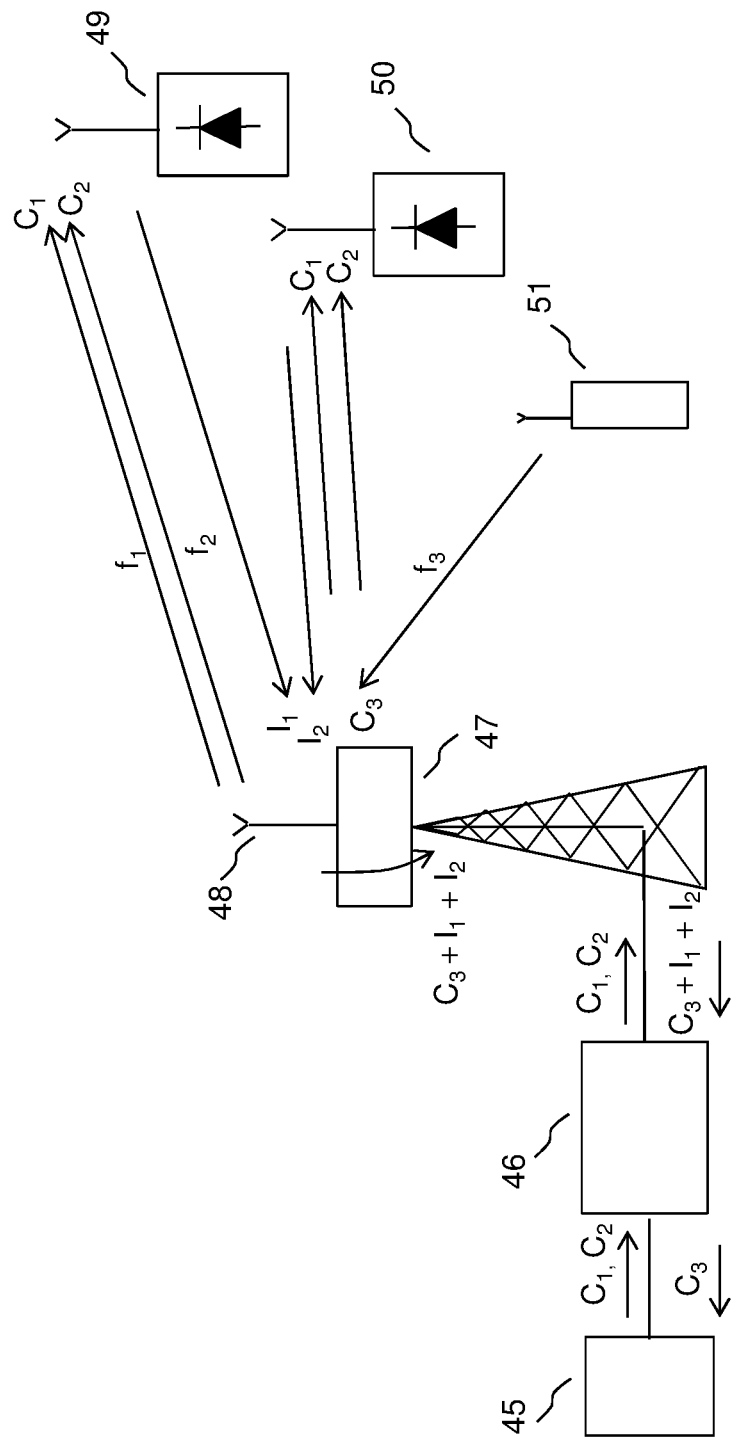
FIG. 1 is a is schematic diagram illustrating an example of interference caused by PIM products generated by two sources of PIM.

FIG. 1 shows an example of a scenario in which interference comprising PIM products of two transmitted signals C1 and C2 is generated in two or more passive non-linear devices 49, 50 and is received in a waveform received at the input to a receiver. In this example the receiver is in a radio head 47 of a cellular radio base station. The interference is mitigated by the canceller apparatus 46 in an embodiment of the invention. The canceller 46 has access to the received waveform in sampled baseband form on a data link from the radio head 47, and also has access to the two transmitted signals C1 and C2, also in sampled baseband form, on a data link from a baseband unit 45. The canceller generates a replica of the interference, and combines the replica with the received waveform in an appropriate phase and amplitude relationship to reduce the interference in the received waveform by cancellation.

The replica is generated by generating a first stream of time samples of a simulated PIM product having an exponent value expected to generate PIM at a frequency that falls in the receive bandwidth of the receiver, and, as appropriate, generating further streams of PIM products of other exponent values that would also be expected to generate PIM in the receive bandwidth. A second stream of time samples is also generated as a delayed version of the first stream, and delayed versions of any further streams are also generated. The replica of the interference is then generated by processing at least the first stream and the second stream, and also processing the further streams where these are generated. The processing may comprise applying a respective weighting value to each stream, each weighting value being determined by correlation of the stream with the received waveform, so that each stream is processed to have a respective amplitude and phase corresponding to the matching component in the received PIM in the received waveform. The replica may be in the form of a matrix, each stream of time samples being a row of the matrix, the combining being a process of combining a time sample from each row with the corresponding time sample of the received waveform to cancel the interference. The replica may be in the form of a stream of time samples that is the combination of the rows. In this case the single combined stream of time samples of the replica is combined with the stream of time samples of the received waveform to cancel the interference.

The processing of the first stream and the second stream to produce the replica may comprise reducing a degree of correlation between the first stream and the second, delayed, stream, that is to say orthogonalising the first and second streams. This may improve the effectiveness of the cancellation of the interference for cases where the first and second stream are correlated, as may be the case when the delay between the first and second streams is relatively short, being less than approximately the inverse of the bandwidth of the received PIM signal in the received waveform.

The orthogonalising may be performed by combining a weighted version of the first stream with the second stream, to cancel components of the second stream that are correlated with the first. If there are further streams and further delayed streams, an orthogonalisation process may also be performed for each further stream, by combining a weighted version of a further stream with the delayed version of the further stream. Furthermore, each stream of the matrix may be orthogonalised with respect to each other stream, so that in a matrix representing the streams as rows, the matrix is processed so that each row is orthogonalised with respect to each other row.

It may only be beneficial to perform the orthogonalising function between the first and second streams if the first and second streams are correlated. The shape of a correlation between one of the streams, which may be the first stream, and the received waveform may reveal the extent of the correlation between received PIM sources, and so analysis of the profile of the correlation may be used to determine whether or not to orthogonalise each stream with respect to the delayed version of the stream.

The value of the delay between the first and second streams may be determined by a process involving correlating the first stream with the received waveform stream to generate a profile of correlation as a function of relative delay, as an initial step. If analysis of the profile shows two or more distinct peaks, then the first stream is generated with a delay corresponding to the delay of one of the peaks, and the second stream is generated with a delay corresponding to a second of the peaks, and further delayed streams may also be generated with delays corresponding to further peaks, corresponding to third, fourth, and so on PIM sources. If analysis of the profile shows that a peak has shape indicating that it corresponds to two closely spaced correlated PIM sources, for example due to the width of the peak, and/or the frequency slope of the PIM frequency spectrum is greater than a threshold value, then it may be determined that a parameter optimization process should be initiated to determine the delay between first and second streams corresponding to the closely spaced PIM sources. Values of relative delay between the peaks are tried iteratively, and a trial cancellation of interference in the received signal is carried out using replica interference based on orthogonalised and weighted first and second streams for each relative delay to select a value of relative delay. For each value of relative delay, values of absolute delay between the replica and the received waveform are tried iteratively, and a trial cancellation of interference in the received signal is carried out using replica interference based on orthogonalised and weighted first and second streams for each absolute delay to select a value of absolute delay.

Relative delays and frequency offsets between the received and simulated PIM products may be determined by a trial of candidate values, and appropriate values may be selected on the basis of increasing, or maximizing, the value of a correlation between the received and simulated non-linear products. The processed streams may then be combined with the received waveform, using the determined relative delays and frequency offsets and the amplitude and phase weights.

In FIG. 1, the interference comprises passive intermodulation (PIM) products of a first signal C1 and a second signal C2. In some embodiments, the first and second signal may be contiguous frequency blocks, so that in effect the first and second signal may be regarded as a single signal. In some embodiments the interference may comprise passive intermodulation (PIM) products of a single signal C1, caused by intermodulation of frequency components within the signal. For example, an Orthogonal Frequency Division Multiplexing (OFDM) signal, as for example used in an LTE cellular system, may occupy a broad bandwidth, and components at different frequencies may interact with each other in a non-linear device to produce PIM. In this case, simulated PIM products may be generated on the basis of a single signal C1, for example by applying the single signal C1 to a non-linear function.

Considering further the scenario illustrated in FIG. 1, a first downlink signal C1 and a second downlink signal C2 are sent at baseband from a base station modem unit 45 to a Remote Radio Head (RRH) unit 47 as a data stream on a data link such as a Common Public Radio Interface (CPRI) data link. The data link carries both uplink and downlink CPRI data streams. The base station modem unit may be referred to as a baseband unit, and is typically, although not necessarily, mounted in a cabinet on the ground. The Remote Radio Head comprises upconverter and downconverter units and is typically, but not necessarily, mounted on a tower at the base station next to the antenna 48 or antennas. The first signal C1 and second signal C2 are upconverted to radio frequency and are transmitted at frequency f1 and frequency f2 respectively. In the example shown in FIG. 1, the first and second signals impinge upon a first source 49 and a second source 50 of non-linear interference products such as passive intermodulation products (PIM) products. The source may, for example, be a metallic component having an oxide layer between metallic parts or comprising a ferromagnetic material. The source may be a component of the RRH 47 such as, for example a diplexer or antenna which are outside a receiver in the RRH, or the source may be a component remote from the RRH, such as an oxidized component on an antenna tower. In addition to PIM products, Passive Harmonic products of each of the first signal and the second signal may be generated.

Figure 2:
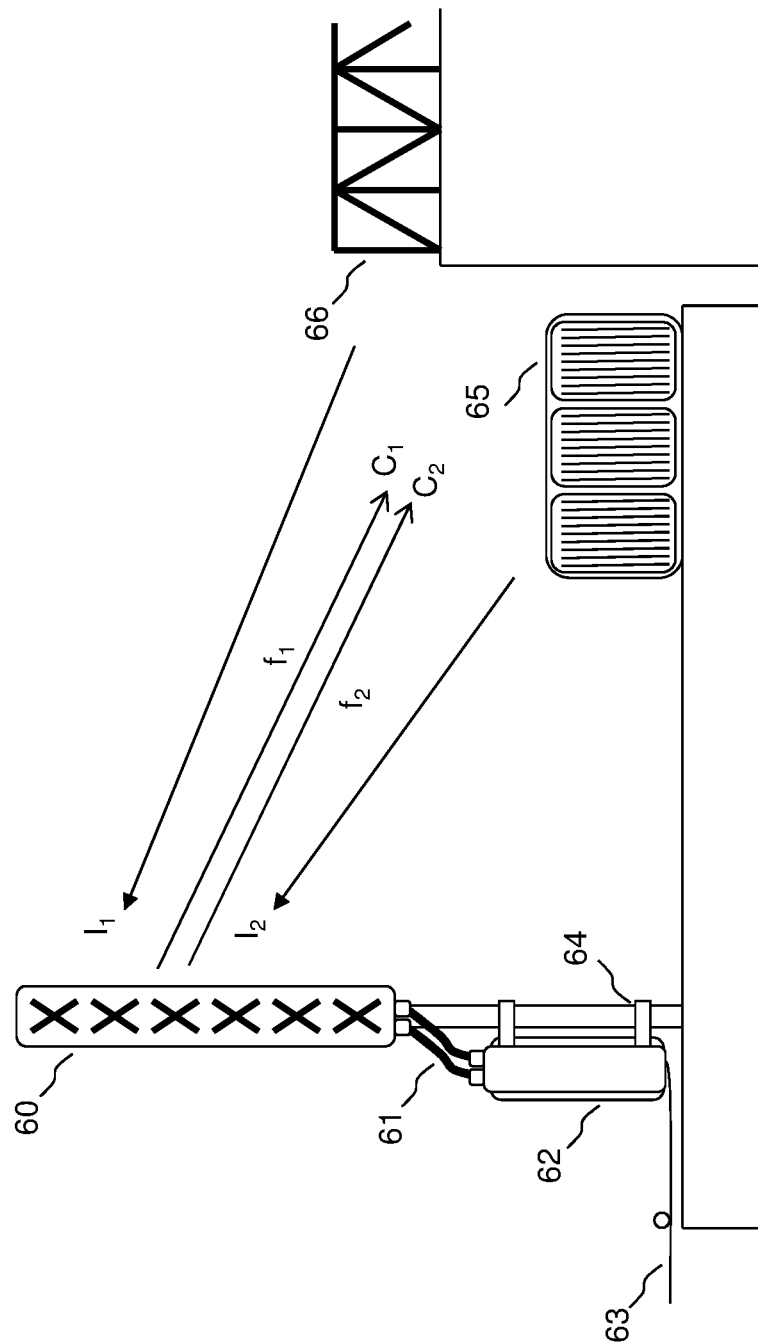
FIG. 2 is a schematic diagram illustrating sources of PIM on a roof top near an antenna.

FIG. 2 shows potential sources of PIM located at different electrical distances from the transmitter and receiver in a rooftop environment. Sources of PIM may be situated in the antenna 60, for example a metal junction in the antenna housing, for example in the cabling or mechanical supports, or at a damaged joint within the antenna. There may also be sources of PIM in the jumper cables 61 between the RRH 62 and the antenna 60, for example a damaged connector at the antenna, a damaged connector at the RRH, or a damaged jumper cable; these PIM sources are closely spaced and are likely to be correlated. A metal junction in the RRH mounting 64 may be a source of PIM, as may rusty roof furniture 65 such as an air conditioning unit, and rusty roof furniture on a nearby building 66. PIM sources in the antenna 60 and rusty roof furniture 65, 66 may be far enough apart to be decorrelated.

Figure 3:
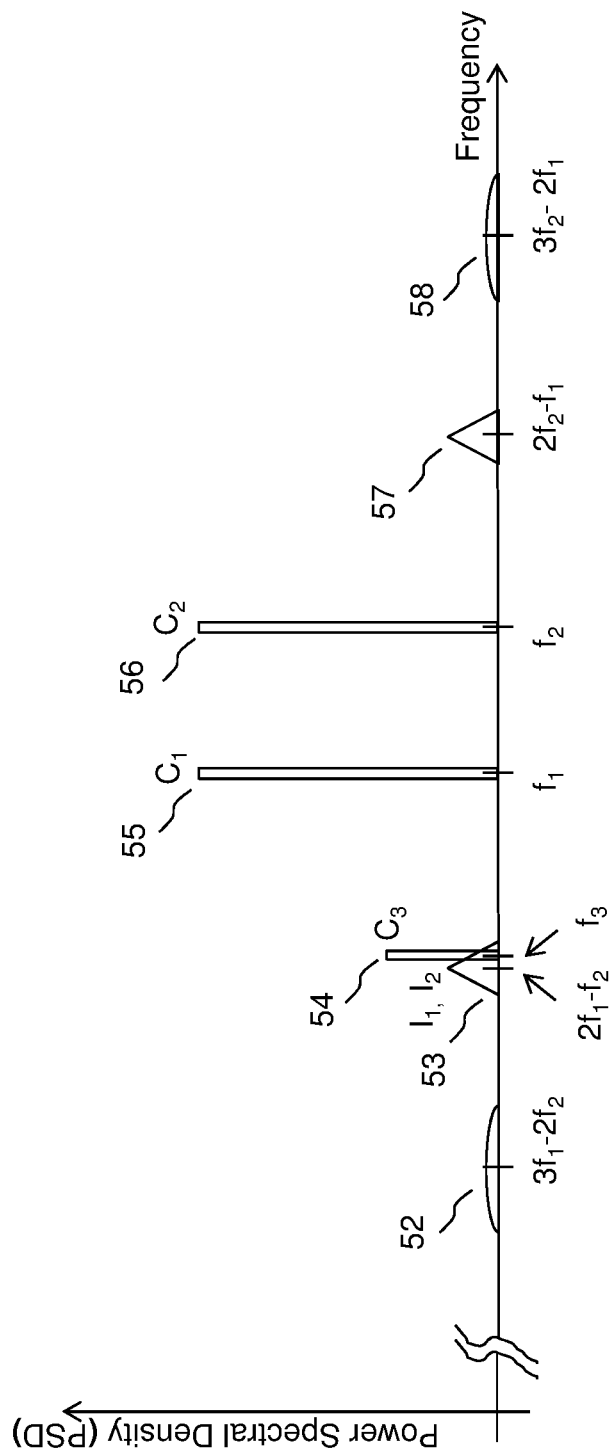
FIG. 3 is a schematic diagram illustrating passive non-linear products in the frequency domain.

FIG. 3 shows intermodulation products in the frequency domain. It can be seen that the first signal 55 at frequency f1 and the second signal 56 at frequency f2 may produce, for example, third order products 54, 57 at frequencies 2f1-f2 and 2f2-f1, and fifth order products 52, 58 at frequencies 3f1-2f2 and 3f2-2f1. Other products (not shown) may also be generated.

In the case illustrated by FIG. 3, an uplink signal, i.e. a received signal C3 54 at frequency f3 falls within the frequency spectrum occupied by the low side third order intermodulation products 53. It can be seen that there is typically an offset between the frequency of the received signal 54 and the center of the frequency spectrum occupied by the low side third order intermodulation products 53, since there is typically no reason to expect the frequencies to be equal. The intermodulation products typically occupy a broader band than the signals from which they are generated, and there may be more than one received signal falling within the spectrum occupied by the intermodulation products.

Referring again to FIG. 1, it can be seen that intermodulation products I1 and I2 of the first and second signals are transmitted from the first and second PIM sources 49, 50, in this example at 2f1-f2. The intermodulation products I1 and I2, in this example, fall, at least in part, within a received uplink channel at f3 and appear as interference to a received signal C3 that is transmitted at radio frequency from, for example, a user equipment 51 in communication with the base station. The received signal C3 and the intermodulation products I1 and I2 appearing as interference to the received signal are received in a waveform at a receiver in the wireless network, such as for example PIM generated in the antenna or a diplexer. The received waveform may be downconverted to baseband in the RRH 47 and sent on the data link to the baseband/modem unit 45. The designations C1, C2 and C3 are used to designate the first, second and third signals irrespective of the carrier frequency. That is to say, the first signal may be designated as C1 at radio frequency as transmitted by an antenna, but it is also designated as C1 and referred to as the first signal at baseband, that is to say at zero or near zero intermediate frequency. Similarly, the term "received waveform" is used to refer to radio frequency, intermediate frequency or baseband representation of the received waveform, independently of carrier frequency. The received waveform may be in analogue or sampled data form.

In an embodiment of the invention, as shown in FIG. 1, apparatus 46 is provided for reduction of interference to a received signal on at least a single receive channel caused by non-linear products of at least the first signal and the second signal, the first and second signals being downlink signals. The first and second signals C1 and C2 are received at baseband at the apparatus, for example from the data link from the base station modem unit. The apparatus (which may be referred to as a PIM canceller) may select the first signal C1 and the second signal C2 on the basis of a determination of which downlink signal frequencies may produce non-linear products that may fall within a channel of interest that carries the received signal, based on well known relationships between signal frequencies and the frequencies of non-linear products produced from those frequencies. On the basis of this determination, the appropriate first and second downlink signals C1 and C2 may be selected for generation of simulated, that is to say synthesized, non-linear products. On the basis of the first signal and the second signal, simulated non-linear products are generated. The non-linear product or products that are generated may be selected on the basis of which non-linear products would be expected to fall in the channel of interest.

The processing of the first signal (for PH products), and the first and second signal (for PIM products) to generate interference product streams, each stream comprising a stream of time samples of a simulated non-linear product of at least the first signal may be carried out as follows. The simulated non-linear products of at least the first signal may be intermodulation between first and second frequency components from the same or different signals. The intermodulation may be, for example, intermodulation between different subcarriers of an OFDM symbol.

As an example, generation of streams of third order intermodulation products of two signals is considered; similar principles apply to generation of other non-linear products and non-linear products of other orders. It will be shown that several third order intermodulation products can be generated by an exponent 3 non-linear term, and that several further third order products may be generated by an exponent 5 term, and also yet further third order products may be generated by other odd exponent terms. An exponent 3 term is a term of the form x3 in a transfer function of a non-linear device generating interference, or in a corresponding function for generating simulated non-linear products to cancel the interference, and in general an exponent n term is a term of the form xn.

Not all third order intermodulation products that are generated will fall within a band of interest corresponding to a received waveform, potentially representing interference to a received signal.

So, in order to cancel interference in a received waveform, potentially interfering non-linear products may be selected for generation as streams of time samples of simulated non-linear products, and non-linear products that would fall outside the band of interest may be neglected.

So, interference product streams may need to be generated for each of several non-linear products, the non-linear products not necessarily all relating to the same exponent term.

Considering non-linear products generated by an exponent 3 term, from two signals each signal having amplitude modulation A and B respectively, and a phase comprising carrier phase and phase modulation a and b respectively, products due to a non-linearity with exponent 3 are given by:
which may be expanded to give:

The terms of the expansion which are of interest in the present example, in that they may fall in an uplink receive band, are the terms 3A2B cos (2a-b), which represents the lower third order product as shown in FIG. 2 as I3 as indicated by reference numeral 34, and 3AB2 cos (a-2b), which may also be written as 3AB2 cos (2b-a), which represents the upper third order product as shown as indicated in FIG. 3 by reference numeral 57. Products which appear at the fundamental frequencies, and at or around the third harmonics need not be generated, in some embodiments, as baseband intermodulation products in the PIM canceller, since they may be filtered out at a victim receiver. Which of the 'upper' or 'lower' products falls in an uplink receive band will depend upon whether the uplink band is allocated above or below the downlink band. The mathematics above shows that the intermodulation products contain amplitude and phase modulation which is a function of modulation of the first and second signals which generated the intermodulation products, and that baseband intermodulation products may be generated in the PIM canceller from the knowledge of the amplitude and phase of the first and second signals; this information is available in a baseband representation of the first and second signals. For example, to cancel interference as shown in FIG. 3, the lower third order products may be selected for generation of I1 and I2 as interference product streams.

However, in addition to the generation of third order intermodulation products by exponent 3 terms, i.e. cube terms, in a device transfer function, intermodulation products may also be generated at the frequencies expected for third order products, such as 2f1-f2 and 2f2-f1, by exponent terms in a device transfer function of exponents 5, 7, 9, and potentially by any odd power device nonlinearities, where the power is at least as great as the power of the respective term of the device transfer function. Correspondingly, intermodulation products normally termed as 'fifth order' can actually be generated by device nonlinearities of exponents 5, 7, 9 and all higher odd exponent device nonlinearities. The pattern continues in this way for higher (odd) order intermodulation products (i.e. 'seventh', 'ninth' etc.), which can be generated not only by device nonlinearities of the same exponent, but also by device nonlinearities of higher odd exponents.

A stream of time samples of a simulated PIM product of first and second signals of a given exponent value may be generated by applying the first and second signals to a non-linear function having the given exponent, for example exponent 3 terms may be generated by ICI3arg(C), where C is a complex input sample comprising the first and second signal. The first and second signal may be at baseband and the generated output stream of samples may also be at baseband. The first and second signals may be offset from zero frequency within the baseband, and the frequency spacing between the first and second signal need not be the same at baseband as the frequency spacing between the first and second signals when transmitted at radio frequency. The output stream may also be offset from zero frequency.

Interference product streams may be generated from time samples of at least the first signal, by application of the appropriate mathematical function for the non-linear product in question. For the sake of example, one of the simulated non-linear products selected for generation may be the third order product having the mathematical function 5/4 A4 B cos (2a-b) in an exponent 5 expansion representing a product at 2f1-f2. Time samples of the simulated non-linear product may be generated by applying the mathematical function to time samples of signals A and B. Here A=Aa(t) and B=Bb(t) represent amplitude modulation, and a=2pfat+fa(t) and b=2pfbt+fb(t), represent phase modulation of signals A and B. Appropriate delays may be set in the cancellation paths to ensure that the time samples of the simulated non-linear product align in time with the interference which they are intended to cancel, since the interference is time variant in dependence on the content of the first and second signals in terms of amplitude and phase modulation. The amplitude and phase modulation may be as a result of, for example, OFDM, CDMA or GMSK modulation schemes used by the first and second signals A and B.

In the case of passive harmonic non-linear products, similarly to the case with PIM products, several interference product streams may be generated, as it is found that passive harmonic products of a given order may be generated by more than one exponent term.

Each interference product stream, generated in a generator functional block from at least a first signal C1 and in this example from a second signal C2 may be correlated in a correlator functional block with a received waveform, in this case the received waveform comprising C3+I1+I2, to produce a correlation value for each stream. Each correlation value may be used to produce a weight for the respective stream, the weights forming a weightset. Each weight may be applied to the respective interference product stream and the weighted streams may be summed in a summer and to produce a simulated interference signal which may be combined in a combiner with the received waveform, in appropriately delayed and/or frequency shifted form, to reduce or cancel the interference.

Figure 4:
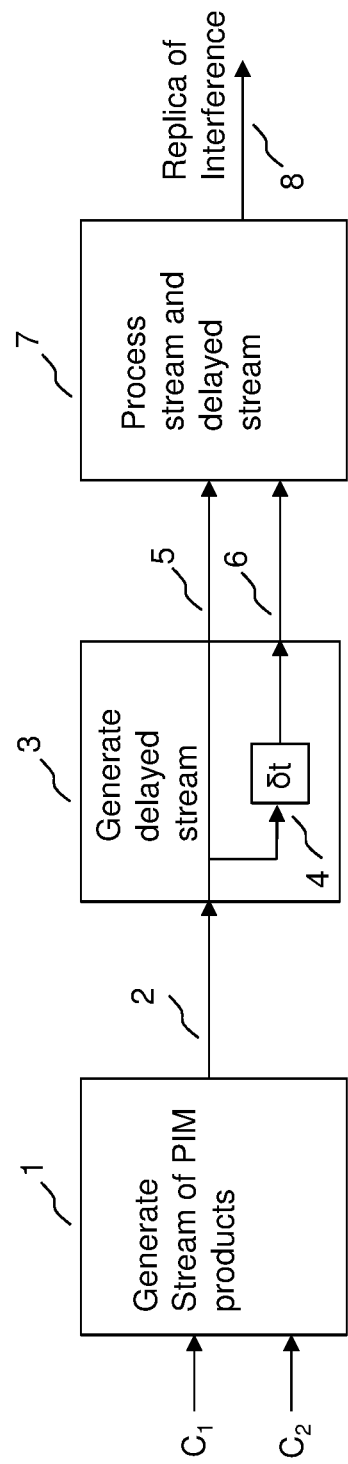
FIG. 4 is a schematic diagram illustrating generation of a replica of interference by generation of a stream of time samples of a PIM product having a first exponent value and a second stream which is a delayed version of the first and by processing the streams to produce the replica.

FIG. 4 shows an embodiment of the invention, in which a first stream of time samples 2 of a simulated first PIM product of the first and second signals is generated in a generation functional block 1, and a second stream of time samples 6 of the simulated first PIM product is generated in a delay functional block 3, by delaying the first stream by a delay element 4. The simulated first PIM product has a first exponent value, for example an exponent of 3. That is to say that first PIM product may be generated by raising a combination of a first signal or signal component and a second signal or signal component to the power of the first exponent value. The first and second components may be frequency components of the same signal. A replica 8 of the interference is generated by processing at least the first stream and the second stream in a processing block 7.

Figure 5:
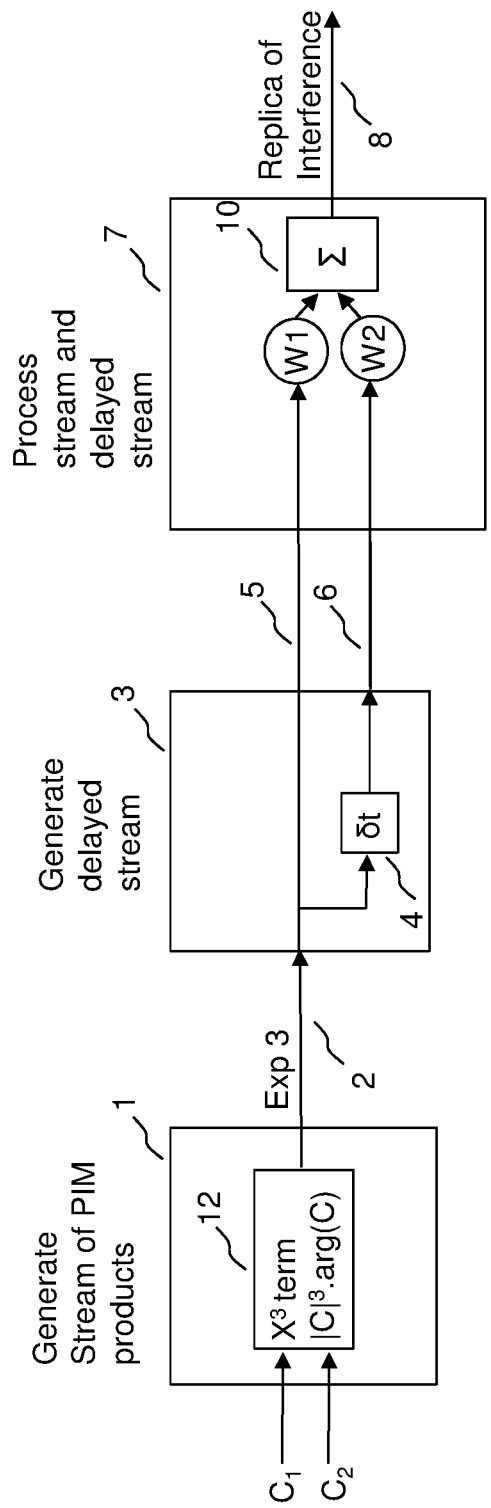
FIG. 5 is schematic diagram showing generation of a stream of PIM products by application of a first and second signal to a non-linear function having an exponent value of 3, and showing processing the first and second streams by applying respective weights to the streams and combining them.

As shown in FIG. 5, the first stream may be generated by applying the first C1 and second C2 signals to a non-linear functional block 12, which is arranged in this example to generate simulated PIM products of exponent 3. Also as shown in FIG. 5, the processing comprises weighting the first stream by a first weighting factor W1 and weighting the second stream by a second weighting factor W2. The phase and amplitude of the first stream may be set independently of the second, delayed, stream to allow for the different propagation characteristics of a first and second source of PIM, so that the replica of the interference 8 may be combined with a stream of time samples of the received waveform to reduce the interference in the received waveform. The first and second streams may first be combined, using combiner 10, before combining with the received waveform. Alternatively, the first and second waveform may be combined separately with the received waveform. In this way the replica of the interference can be generated to simulate interference comprising PIM products generated at two sources having different round trip delays between a transmitter of the first and second signals causing the PIM, the PIM source, and the receiver, so that the replica can be used to cancel the interference in the received waveform effectively. The first weighting factor may be determined by correlating the first stream with the stream of time samples of the received waveform, and determining the second weighting factor by correlating the second stream with the stream of time samples of the received waveform.

Figure 6:
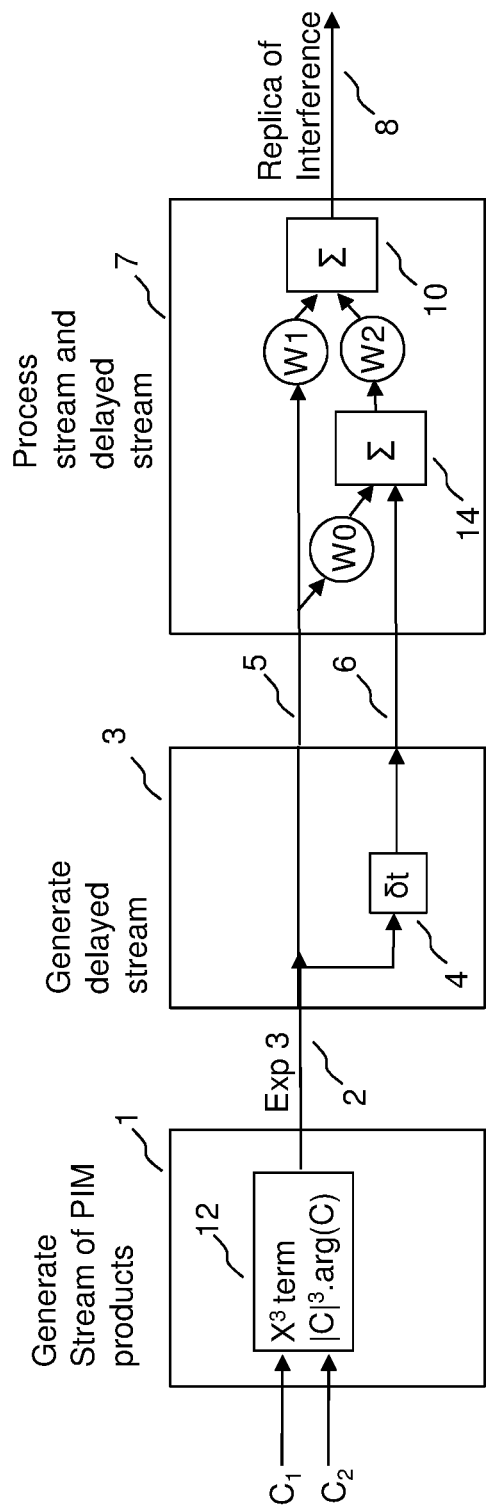
FIG. 6 is schematic diagram showing processing of the first and second streams by combining a weighted version of the first stream with the second stream to reduce the correlation between the first and second streams.

FIG. 6 shows an embodiment of the invention in which the processing of the first and second streams comprises reducing a degree of correlation between the first stream and the second stream, so that the effectiveness of the cancellation of the interference is improved for cases where the first and second stream are correlated. As shown in FIG. 6, the degree of correlation may be reduced by taking a sample of the first stream, weighting the amplitude and phase by a weighting value W0, and combining the weighted first stream with the second stream in combiner 10. As shown in FIG. 6, the degree of correlation between the first stream and the second stream may be reduced by determining a correlation between the first stream and the second stream, determining weighting factor W0 in dependence on the correlation, weighting the first stream of time samples using the weighting factor, and combining the weighted first stream with the second stream to produce a processed second stream of time samples having a reduced degree of correlation with the first stream of time samples. This decorrelation process may also be seen as a matrix manipulation process to achieve a similar result.

Figure 8:
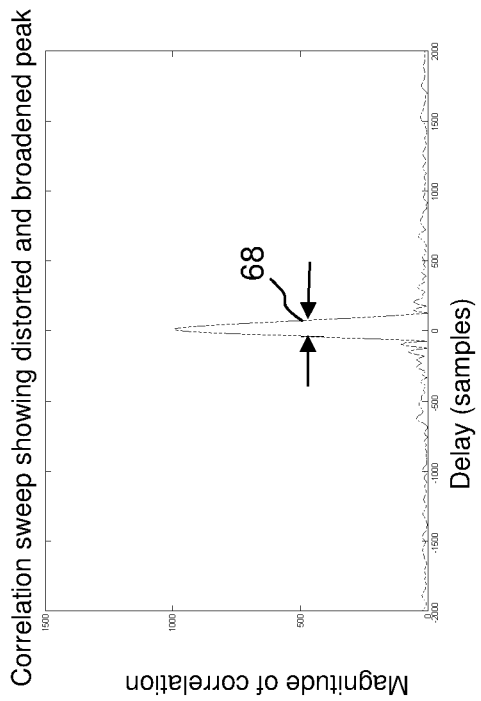
FIG. 8 shows an example of a correlation between a stream of time samples of simulated PIM products and a stream of time samples of a received waveform for various values of delay between them, for interference caused by two closely spaced (correlated) sources of PIM.
Figure 7:
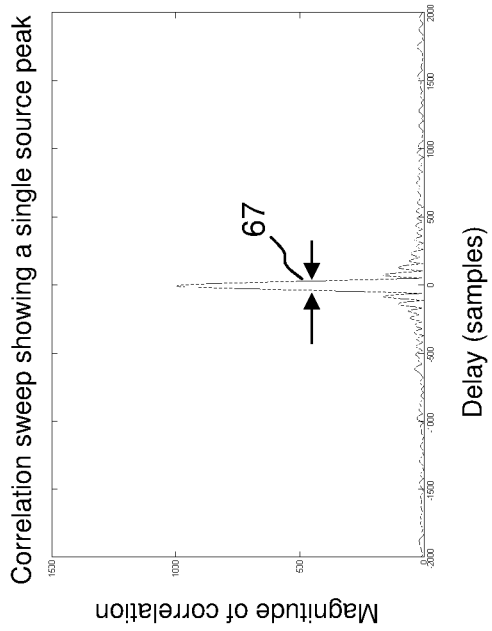
FIG. 7 shows an example of a correlation between a stream of time samples of simulated PIM products and a stream of time samples of a received waveform for various values of delay between them, for interference caused by a single source of PIM.
Figure 9:
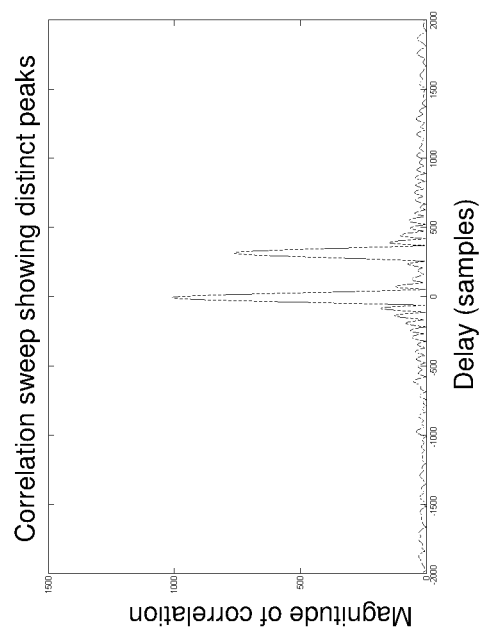
FIG. 9 shows an example of a correlation between a stream of time samples of simulated PIM products and a stream of time samples of a received waveform for various values of delay between them, for interference caused by two widely spaced (uncorrelated) sources of PIM.

The step of reducing the degree of correlation between the first stream and the second stream may be performed in dependence on an analysis of a correlation between the first stream of time samples and a stream of time samples of the received waveform, so that the processing load involved in performing the step of reducing the degree of correlation between the streams may be avoided in cases where analysis of the correlation between the first stream of time samples and the stream of time samples of the received waveform indicates that the step is not required. The analysis of the correlation between the first stream of time samples and the stream of time samples of the received waveform comprises determining a width of a correlation peak, to determine whether or not the decorrelation step is required, since the width of the correlation peak may indicate whether there is more than one source of PIM contributing to the peak. FIG. 7 shows that a single PIM source may produce a relatively narrow width 67 of correlation peak, in comparison with FIG. 8 which shows that two correlated sources of PIM may produce a relatively broad width 68 of correlation peak. FIG. 9 shows two distinct correlation peaks, indicating that there are two uncorrelated sources of PIM. Alternatively or in addition, the analysis of the correlation between the first stream of time samples and the stream of time samples of the received waveform may comprise determining a frequency slope of a correlation peak.

Figure 10:
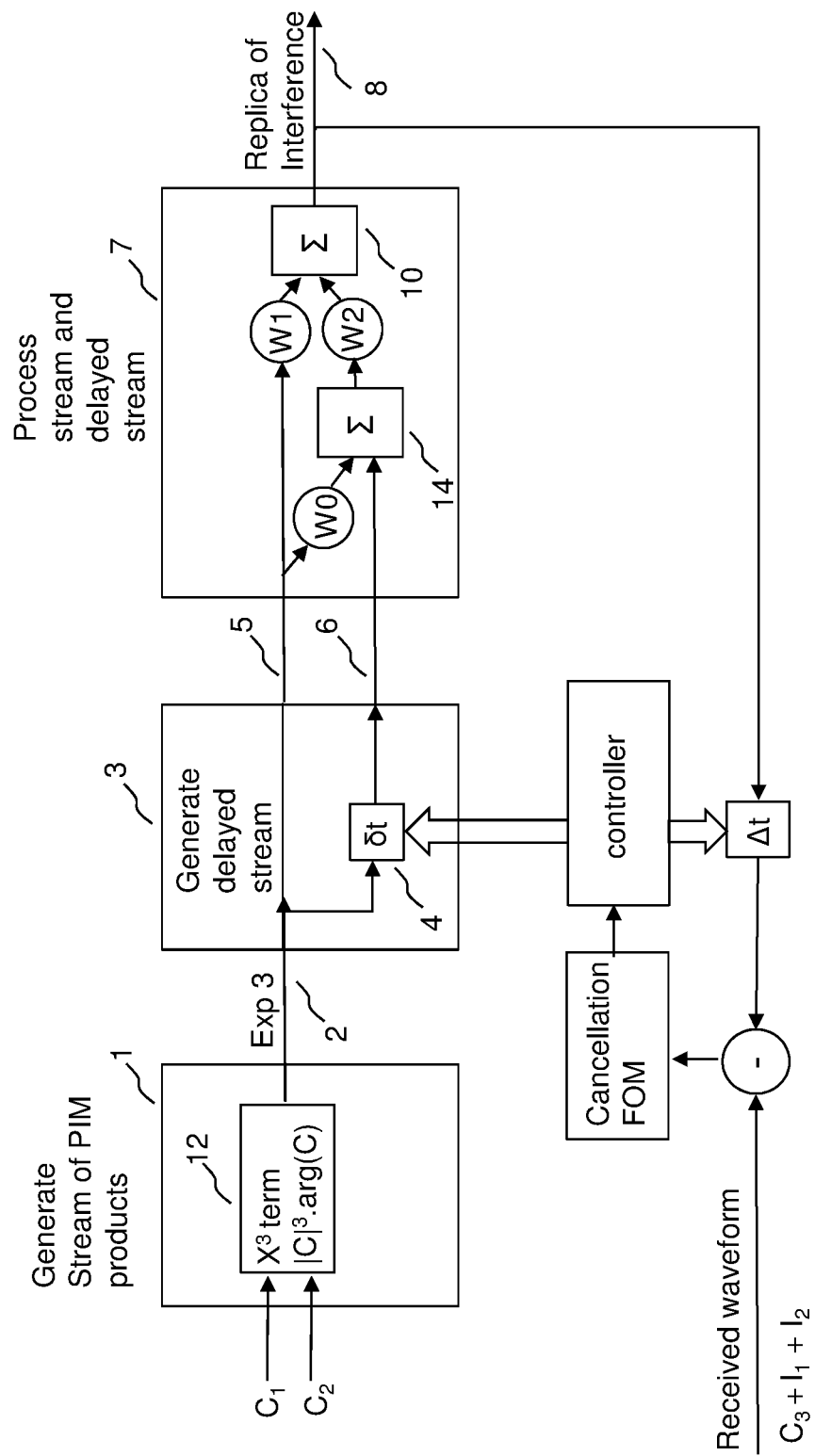
FIG. 10 is a schematic diagram showing control of delay values to improve a cancellation figure of merit (FOM)

FIG. 10 shows a method of setting the value of the delay between the first stream and the second, delayed, stream. Typically during a set up period, and also potentially as a regular update during operation of a real time canceller, a value of the delay of the second stream with respect to the first stream may be varied, to determine a delay value that increases a degree of cancellation of interference in the received waveform, so that an appropriate delay value may be selected. The value δt of the delay element 4 may be varied over a predetermined range of values, and the value that produces the best cancellation may be chosen, when the resulting replica of interference is combined with the received waveform. As shown in FIG. 10, a controller may control the delay element 4 to vary the delay over a range of values. A figure of merit (FOM) of the cancellation may be determined for each value of the delay, and the delay value that produces the best FOM, or a FOM above a threshold may be chosen for use in operation of the canceller. Also as shown in FIG. 10, the replica may be delayed by a second delay factor Δt, which is arranged to compensate for a delay between the replica of interference and the received waveform. The controller may adjust the second delay factor to increase the cancellation FOM. The delay value δt and the second delay factor Δt may be determined on the basis of trial values of delay applied to stored data representing the first stream of time samples, the second stream of time samples, and the stream of time samples of the received waveform. The determined delay may then be used to generate the replica of the interference for use in cancelling the interference in the received waveform in real time. In this way, the delay values δt and/or Δt may be determined in non-real time by the analysis of stored data, without affecting the real-time receive path. Alternatively, the delay values may be determined using real time hardware, for example by applying trial perturbations to the values and determining an improved value based on the cancellation figure of merit.

The replica may be formed as a matrix, a first axis the matrix representing time and a second axis of the matrix representing a respective stream of time samples of a plurality of streams of time samples. In this embodiment, the matrix may consist of weighted streams of time samples without a combination step.

Figure 11:
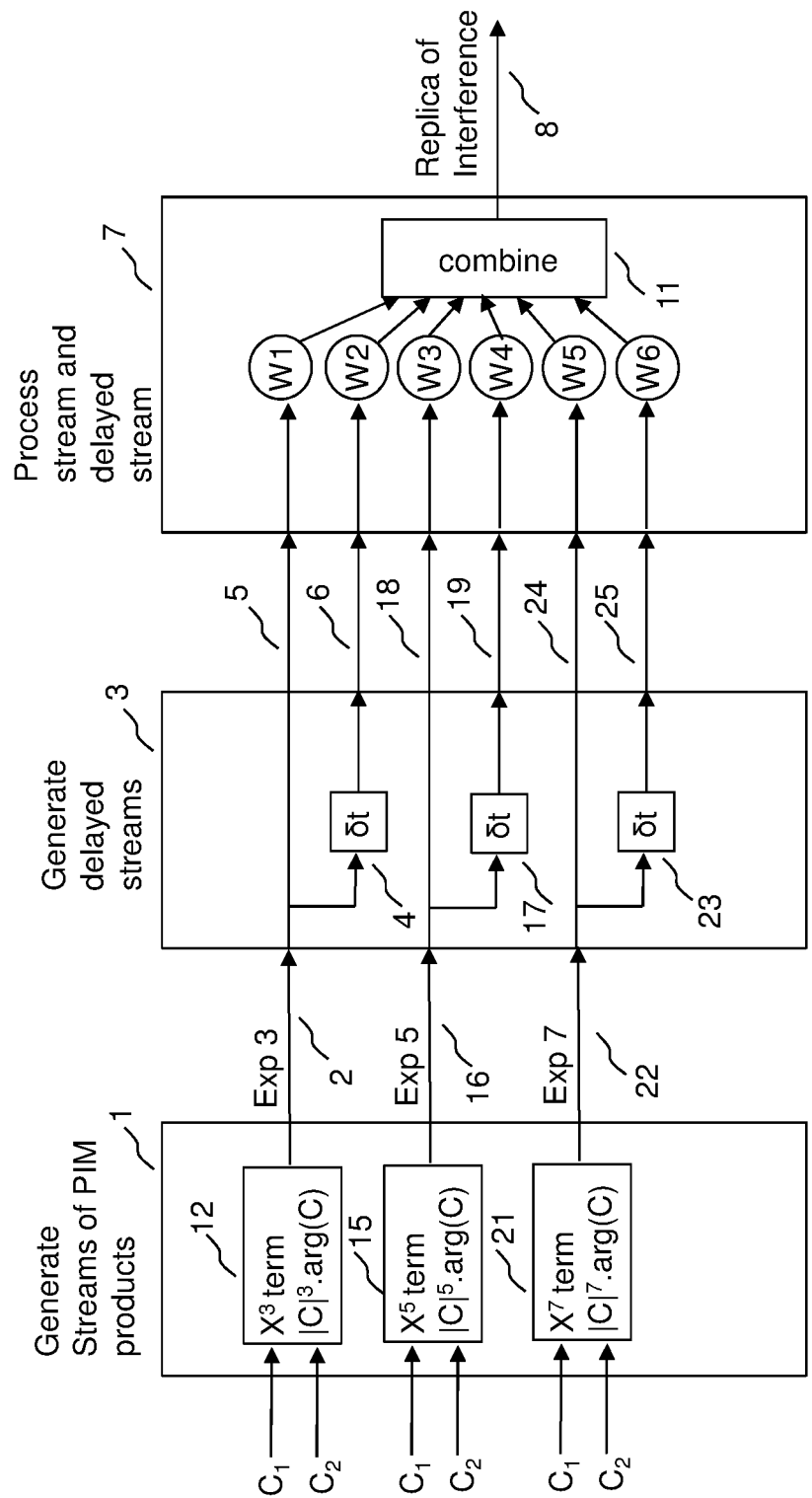
FIG. 11 is a schematic diagram showing generation of a stream of PIM products and a delayed stream for each of several exponent values and weighting of the streams to produce a replica of the interference.

FIG. 11 shows an embodiment of the invention in which a plurality of streams of time samples is generated, comprising a first plurality of streams of time samples 2, 16, 22: 5, 18, 24 for a plurality of values of PIM product exponent and a second plurality of streams of time samples 6, 19, 25 for the plurality of values of PIM product exponent, the second plurality of streams of time samples having a value of delay δt with respect to the first plurality of streams of time samples that is the same for each value of PIM product exponent. This allows the replica to comprise PIM products having several values of exponent. As shown in FIG. 11, three non-linear functions 12, 15 and 21 are provided, generating streams of simulated PIM products having exponent values of 3, 5 and 7 respectively. Each generated stream is used to generate a corresponding delayed stream, and each stream and each delayed stream is weighted by a respective weighting factor W1 to W6.

In the system shown in FIG. 11, similarly to the system of FIG. 10, the value of delay of the second plurality of streams of time samples with respect to the first plurality of streams of time samples may be determined by varying a value of the delay to determine a delay value that increases a degree of cancellation of interference in the received waveform for the first value of PIM product exponent. The value of delay determined for one exponent value may also be used for the streams having a different exponent value.

Figure 12:
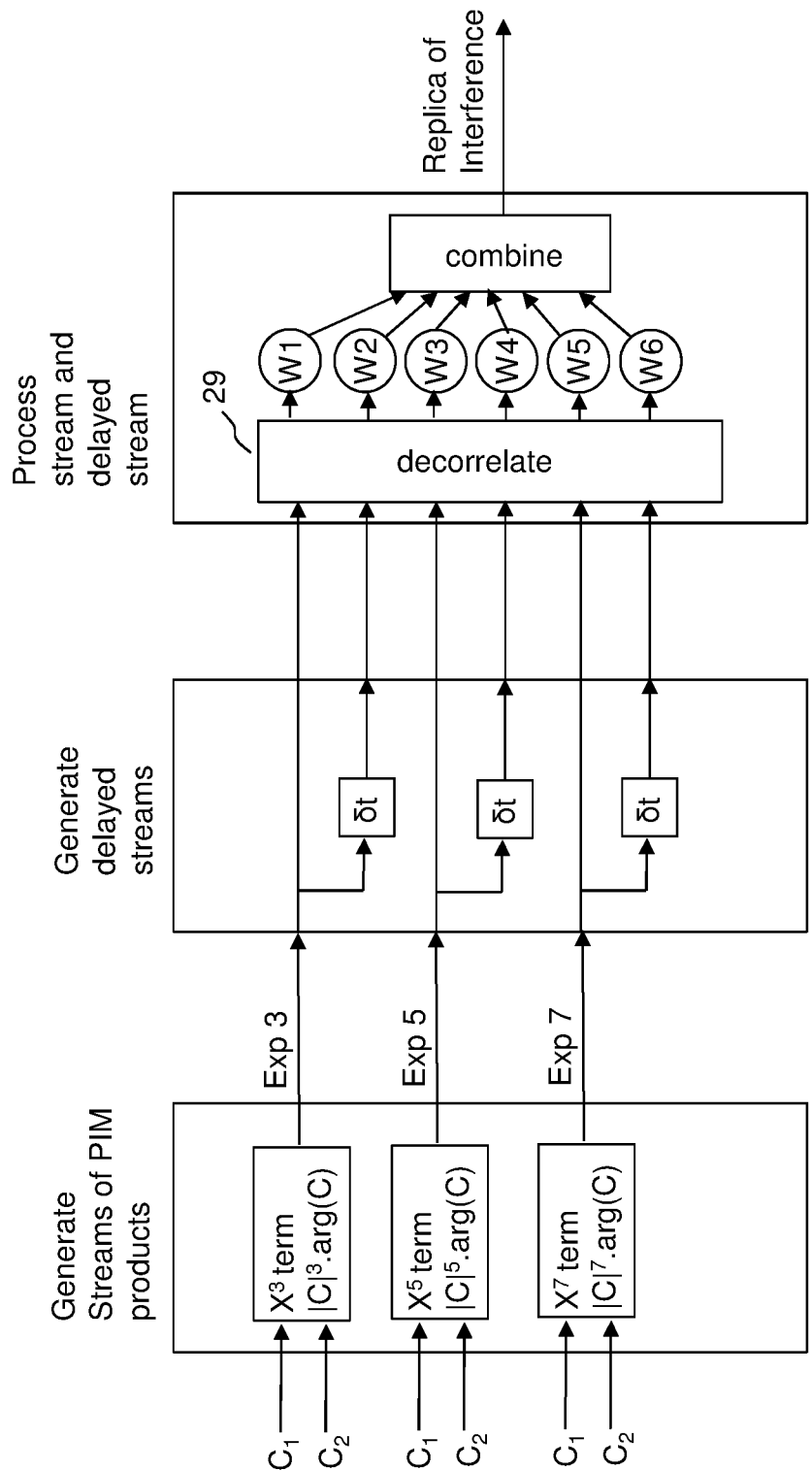
FIG. 12 is a schematic diagram showing decorrelation of the streams of FIG. 11 before weighting and combination to produce the replica of interference.

FIG. 12 shows that a stream of time samples for each of several values of exponent of simulated PIM, and a delayed version of each of the streams, may be generated as in FIG. 11, and each stream, including the delayed streams, may be decorrelated in a decorrelation function 29, that is to say orthogonalised, with respect to each other stream, and then each orthogonalised stream may be weighted and optionally combined together. Alternatively, each stream and its respective delayed version may be separately orthogonalised, as described in connection with FIG. 6.

Figure 13:
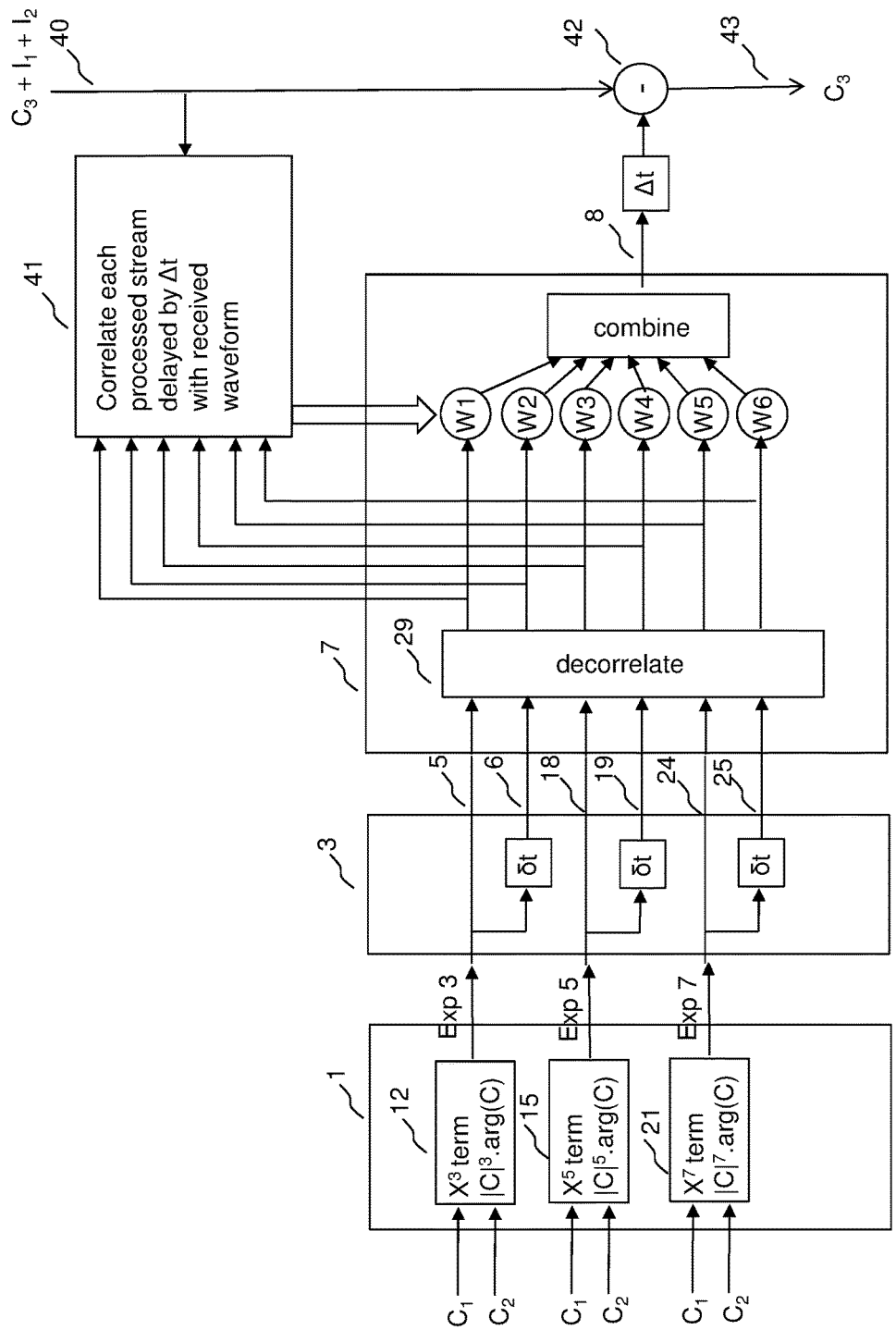
FIG. 13 is a schematic diagram showing a system for cancelling interference in a received waveform comprising PIM generated at two sources having different round trip delays between the transmitter of the signals causing the PIM, the PIM generator, and the receiver.

FIG. 13 shows a PIM canceller according to an embodiment of the invention. It can be seen that first and second signals C1 and C2 are used to generate several streams of simulated PIM products, each being for an exponent value expected to be present in the received interference. Each stream is used to derive a second, delayed, stream. The streams and the delayed streams are orthogonalised, i.e., decorrelated from each other, delayed appropriately, weighted by a respective amplitude and phase weight value, typically implemented at baseband as a complex inphase and quadrature function, and combined with samples of the received waveform, 40, typically at baseband, to produce an output 43 in which levels of interference are reduced. Each weight value is determined by correlating the respective stream of simulated PIM products with the received waveform.

In an embodiment of the invention, which may be termed an exhaustive search, values of the weights W1 to W6, δt and Δt may be varied and tried on a trial and error basis over expected ranges, typically off-line using stored data, and the values that produce the best cancellation figure of merit may be selected for operation of the canceller in real time. This method may avoid the need for an orthogonalisation step, but at the expense of computational intensity.

Figure 14:
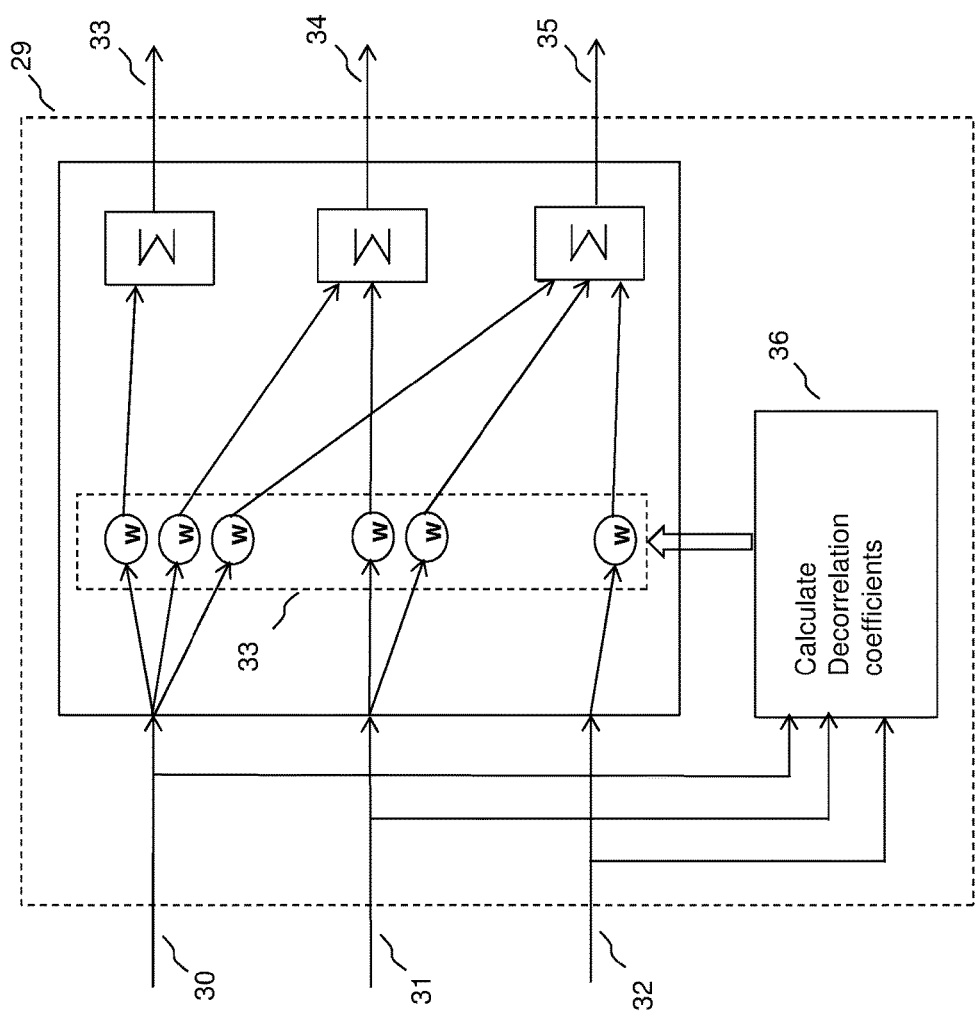
FIG. 14 is a schematic diagram showing an example of an implementation of a decorrelation function.

FIG. 14 shows how a decorrelation, also known as orthogonalisation, step may be performed, such as the decorrelation function 29 of FIG. 12. Decorrelation coefficients may be calculated by a processor 36, by measuring the correlation between each combined stream and adjusting such weight to reduce the correlation. So, the first stream 30 is combined with a second stream 31 and a third stream 32. The portion of the first stream added into the second stream is weighted in amplitude and phase to cancel any correlated components in the second stream, and similarly the portion of the first stream added into the third stream is weighted in amplitude and phase to cancel any correlated components in the third stream. A similar approach may be taken to cancel the correlations of the second stream with the third stream, as illustrated.

Alternatively, a matrix representation of the streams may be processed by a matrix operation to orthogonalise the streams of time samples represented as rows of the matrix, by a matrix orthogonalisation process, that involves processing a correlation matrix representing correlations between the interference product streams to produce a second matrix, which may referred to as a weighting matrix. The interference product streams may be multiplied by the second matrix to produce the processed interference streams. The correlation matrix may be calculated on the basis of samples of the interference product streams received during a first period, and the processing of the interference product streams to reduce the degree of correlation between the streams may use samples of the interference product streams received during a second period, different from the first period. The calculation of the correlation matrix may be performed infrequently or in non-real time to produce the second matrix, reducing the requirement for processing resource and the second matrix may be applied in real time. Application of the second matrix, which may involve weighting and summing some or all of the plurality of interference product streams, may be relatively straightforward and less demanding of processing resources to perform in real time in comparison with the calculation of the correlation matrix, which may not need to be performed in real time. This may be particularly advantageous when the correlation matrix is expected to be static or slowly varying in relation to the sampling time. So, although the correlation matrix may represent statistical properties, such as amplitude distribution, of the interference product streams received during the first period, provided the statistical properties of the interference product streams remain substantially constant or are slowly varying, the calculation representing interference streams received in the first period may be expected to be valid outside the first period. As a result, occasional re-calculation of the correlation matrix may be sufficient.

The processing of the first matrix, the 'correlation matrix', to produce the second matrix, the 'orthogonalising matrix', may comprise determining the inverse of the square root of the correlation matrix. This may be applicable if, for example, it is known or expected that the correlation matrix will consist of values which are wholly or substantially real-valued. So, the matrix square root D of the correlation matrix R may be found, defined by DD=R and then the inverse of that may be found, namely inv(D).

Alternatively the second matrix may be produced by a process involving a decomposition, for example the Cholesky decomposition, which decomposes a correlation matrix, which may be complex, into a product of a matrix with the Hermitian conjugate of itself defined by D*D=R (where * denotes Hermitian transpose). Using a Cholesky decomposition has the advantage that the second matrix, derived by matrix inversion from the matrix obtained via the Cholesky decomposition, should have a triangular form, in which some of the terms typically have a value of 0, so that the process of processing interference product streams by applying the second matrix in the form of weights is simplified, as some weights will typically have the trivial values of 0. The method according to an embodiment of the invention may involve Cholesky decomposition of either the inverse of the correlation matrix or alternatively calculating the inverse of the decomposition. The latter order may have the advantage of simplifying the matrix inverse calculation as the Cholesky decomposition will typically result in a triangular matrix.

The functional blocks of a canceller/detector 46 in embodiments of the invention may be implemented by means of a processor, typically a digital signal processor. The processor may be implemented using dedicated hardware or firmware logic such as a field programmable gate array, or as a processor arranged to execute computer readable instructions to carry out the functions of the functional blocks, or as a combination of hardware and software elements. Well known methods of implementing digital signal processing and control functions may be used.

So, in embodiments of the invention, interference is mitigated in a waveform received at the input of a receiver in a wireless network, the interference comprising passive intermodulation (PIM) products of at least a first signal, by: generating a first stream of time samples of a simulated first PIM product of at least the first signal, and generating a second stream of time samples of the simulated first PIM product, the simulated first PIM product relating to a first exponent value, wherein the second stream has a delay with respect to the first stream; generating a replica of the interference by processing at least the first stream and the second stream; and combining the replica of the interference with a stream of time samples of the received waveform, whereby to reduce the interference in the received waveform.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of mitigating interference in a waveform received at the input of a receiver in a wireless network, the interference comprising passive intermodulation (PIM) products of at least a first signal, the method comprising:
    generating a first stream of time samples of a simulated first PIM product of at least the first signal, and generating a second stream of time samples of the simulated first PIM product, wherein the second stream has a delay with respect to the first stream;
    generating a replica of the interference by processing at least the first stream and the second stream, wherein said processing comprises determining a first weighting factor by correlating the first stream with a stream of time samples of the received waveform, and determining a second weighting factor by correlating the second stream with the stream of time samples of the received waveform, and weighting the first stream by a first weighting factor and weighting the second stream by a second weighting factor; and
    combining the replica of the interference with the stream of time samples of the received waveform, whereby to reduce the interference in the received waveform.

2. The method according to claim 1, wherein said processing further comprises reducing a degree of correlation between the first stream and the second stream comprising:
    determining a correlation between the first stream and the second stream;
    determining a third weighting factor in dependence on the correlation;
    weighting a sample of the first stream using the third weighting factor to produce a weighted sample of the first stream; and
    combining the weighted sample of the first stream with the second stream.

3. The method according to claim 2, comprising performing the step of reducing the degree of correlation between the first stream and the second stream in dependence on an analysis of the correlation between the first stream of time samples and the stream of time samples of the received waveform.

4. The method according to claim 3, wherein the analysis of the correlation between the first stream of time samples and the stream of time samples of the received waveform comprises determining a width of a correlation peak.

5. The method according to claim 1, wherein said generation and processing of the first stream and the second stream is at baseband.

6. The method according to claim 1, comprising:
    varying a value of the delay of the second stream with respect to the first stream to determine a delay value that increases a degree of cancellation of interference in the received waveform.

7. The method according to claim 6, comprising:
    determining the delay value on the basis of trial values of delay applied to stored data representing the first stream of time samples, the second stream of time samples, and the stream of time samples of the received waveform; and using the determined delay to generate the replica of the interference for use in cancelling the interference in the received waveform in real time.

8. The method according to claim 1, comprising forming the replica as a matrix, a first axis the matrix representing time and a second axis of the matrix representing a respective stream of time samples of a plurality of streams of time samples.

9. The method according to claim 1, wherein the simulated first PIM product relates to a first exponent value.

10. The method according to claim 1, comprising generating a plurality of streams of time samples comprising a first plurality of streams of time samples for a plurality of values of PIM product exponent and a second plurality of streams of time samples for the plurality of values of PIM product exponent, the second plurality of streams of time samples having a value of delay with respect to the first plurality of streams of time samples that is the same for each value of PIM product exponent.

11. The method according to claim 10, wherein the value of delay of the second plurality of streams of time samples with respect to the first plurality of streams of time samples is determined by varying a value of the delay to determine a delay value that increases a degree of cancellation of interference in the received waveform for the first value of PIM product exponent.

12. Apparatus for mitigating interference in a waveform received at the input of a receiver in a wireless network, the interference comprising passive intermodulation (PIM) products of at least a first signal, the apparatus comprising a digital signal processor configured to:

generate a first stream of time samples of a simulated first PIM product of at least the first signal, and generating a second stream of time samples of the simulated first PIM product, wherein the second stream has a delay with respect to the first stream;

generate a replica of the interference by processing at least the first stream and the second stream, wherein said processing comprises determining a first weighting factor by correlating the first stream with a stream of time samples of the received waveform, and determining a second weighting factor by correlating the second stream with the stream of time samples of the received waveform, and weighting the first stream by a first weighting factor and weighting the second stream by a second weighting factor; and combine the replica of the interference with the stream of time samples of the received waveform, whereby to reduce the interference in the received waveform.

13. The apparatus according to claim 12, wherein the digital signal processor is configured to generate and process the first stream and the second stream at baseband.

14. The apparatus according to claim 12, wherein the digital signal processor is configured to vary a value of the delay of the second stream with respect to the first stream to determine a delay value that increases a degree of cancellation of interference in the received waveform.

15. The apparatus according to claim 14, wherein the digital signal processor is configured to:

determine the delay value on the basis of trial values of delay applied to stored data representing the first stream of time samples, the second stream of time samples, and the stream of time samples of the received waveform; and use the determined delay to generate the replica of the interference for use in cancelling the interference in the received waveform in real time.

16. The apparatus according to claim 12, wherein the digital signal processor is configured to form the replica as a matrix, a first axis the matrix representing time and a second axis of the matrix representing a respective stream of time samples of a plurality of streams of time samples.

* * * * *